US010412896B2

(12) United States Patent
Ohms et al.

(10) Patent No.: US 10,412,896 B2
(45) Date of Patent: Sep. 17, 2019

(54) SYSTEM AND METHOD FOR INSTALLING SEPARATOR GRATES WITHIN AN AGRICULTURAL COMBINE

(71) Applicant: CNH Industrial America, LLC, New Holland, PA (US)

(72) Inventors: Travis J. Ohms, Davenport, IA (US); Michael J. Matway, Litchfield, IL (US); Craig E. Murray, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 176 days.

(21) Appl. No.: 15/351,541

(22) Filed: Nov. 15, 2016

(65) Prior Publication Data

US 2018/0132421 A1 May 17, 2018

(51) Int. Cl.
*B07B 1/00* (2006.01)
*A01F 12/44* (2006.01)
*A01F 12/26* (2006.01)

(52) U.S. Cl.
CPC ............ *A01F 12/446* (2013.01); *A01F 12/26* (2013.01)

(58) Field of Classification Search
CPC .............................. A01D 12/446; A01D 12/26
USPC ......................................... 460/101, 107–110
See application file for complete search history.

(56) References Cited

U.S. PATENT DOCUMENTS

| | | | | |
|---|---|---|---|---|
| 1,099,070 A * | 6/1914 | McConnell | A01F 12/28 | 460/109 |
| 1,938,986 A * | 12/1933 | Thoen | A01F 12/24 | 209/397 |
| 2,053,148 A * | 9/1936 | James | A01F 7/06 | 209/398 |
| 3,470,881 A | 10/1969 | Knapp et al. | | |
| 3,568,682 A | 3/1971 | Knapp | | |
| 3,871,384 A * | 3/1975 | Depauw | A01F 12/20 | 460/109 |
| 4,711,252 A | 12/1987 | Bernhardt et al. | | |

(Continued)

FOREIGN PATENT DOCUMENTS

| | | |
|---|---|---|
| CA | 2212881 | 2/1999 |
| DE | 29820700 | 11/1998 |

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

A system for installing separator grates within a combine may include a grate frame having first and second frame members extending circumferentially between proximal and distal ends. The system may also include a first and second separator grate sections configured to be supported between the frame members along first and second circumferential frame sections of the grate frame, respectively. Additionally, the grate frame may include first and second guide rails extending between the frame members along at least a portion of the first circumferential frame section. When the first separator grate section is being installed from a side of the grate frame located adjacent to the proximal end, at least a portion of the first separator grate section may be configured to ride along the guide rails at a location between the frame member as the first separator grate section is moved towards the distal end of the grate frame.

16 Claims, 12 Drawing Sheets

110 108 100 170 146 148 120 136,144 140,144 118 156 124 102 132 150 166 126 154 138,144 106 114 142,144

(56) References Cited

U.S. PATENT DOCUMENTS

| | | | | |
|---|---|---|---|---|
| 5,024,631 | A * | 6/1991 | Heidjann | A01F 12/26 460/109 |
| 5,613,907 | A | 3/1997 | Harden | |
| 5,993,313 | A | 11/1999 | Healy et al. | |
| 6,358,142 | B1 | 3/2002 | Imel et al. | |
| 6,398,639 | B1 | 6/2002 | Dammann et al. | |
| 6,485,364 | B1 * | 11/2002 | Gryspeerdt | A01D 41/1271 460/107 |
| 6,758,745 | B2 | 7/2004 | Van Der Haegen et al. | |
| 7,137,882 | B2 * | 11/2006 | Holtmann | A01F 12/185 460/75 |
| 7,166,026 | B2 * | 1/2007 | Ricketts | A01F 12/26 460/108 |
| 7,393,274 | B2 * | 7/2008 | Voss | A01F 12/28 460/109 |
| 8,133,101 | B2 * | 3/2012 | Regier | A01F 12/181 460/109 |
| 8,313,361 | B2 | 11/2012 | Flickinger et al. | |
| 2003/0140612 | A1 * | 7/2003 | Gorden | A01F 12/446 56/100 |
| 2006/0019731 | A1 | 1/2006 | Ricketts et al. | |
| 2011/0151951 | A1 | 6/2011 | Regier et al. | |
| 2012/0270612 | A1 | 10/2012 | Baltz et al. | |
| 2015/0250101 | A1 | 9/2015 | Kile | |

* cited by examiner 112
136,144
150
164
162
132
146
118
178
154
124
102
114
152
160

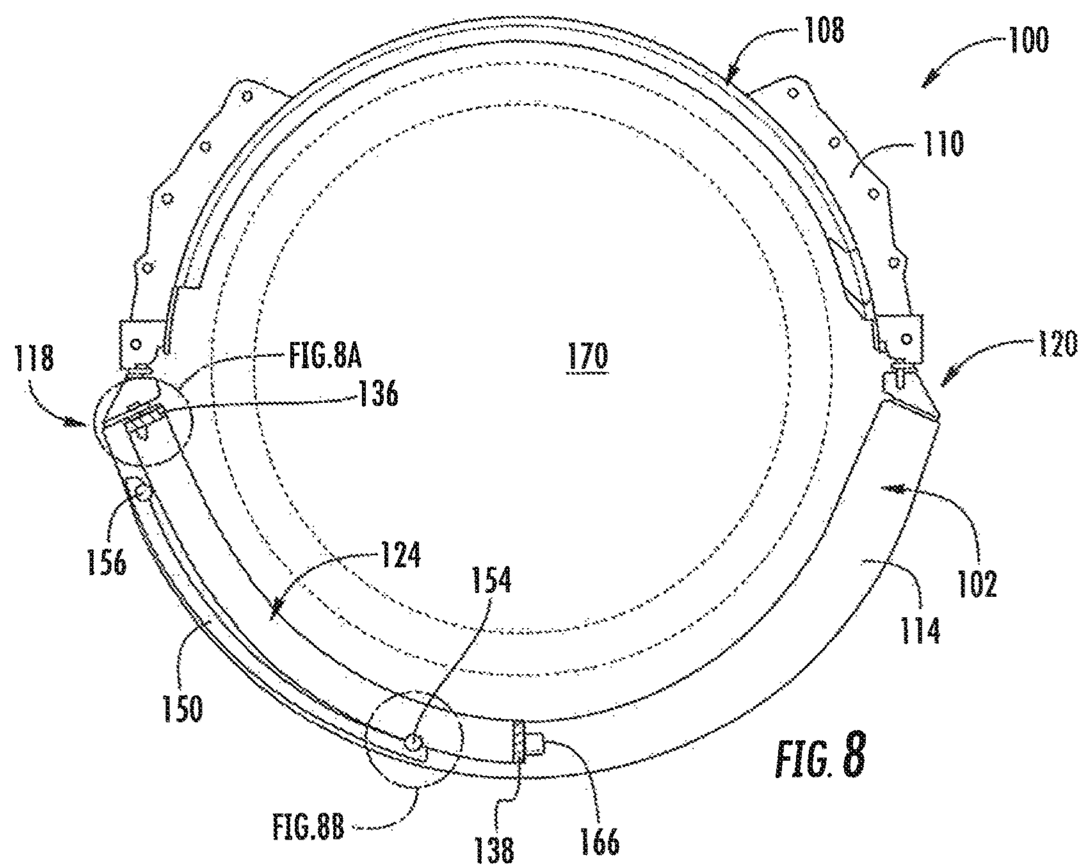
FIG. 8
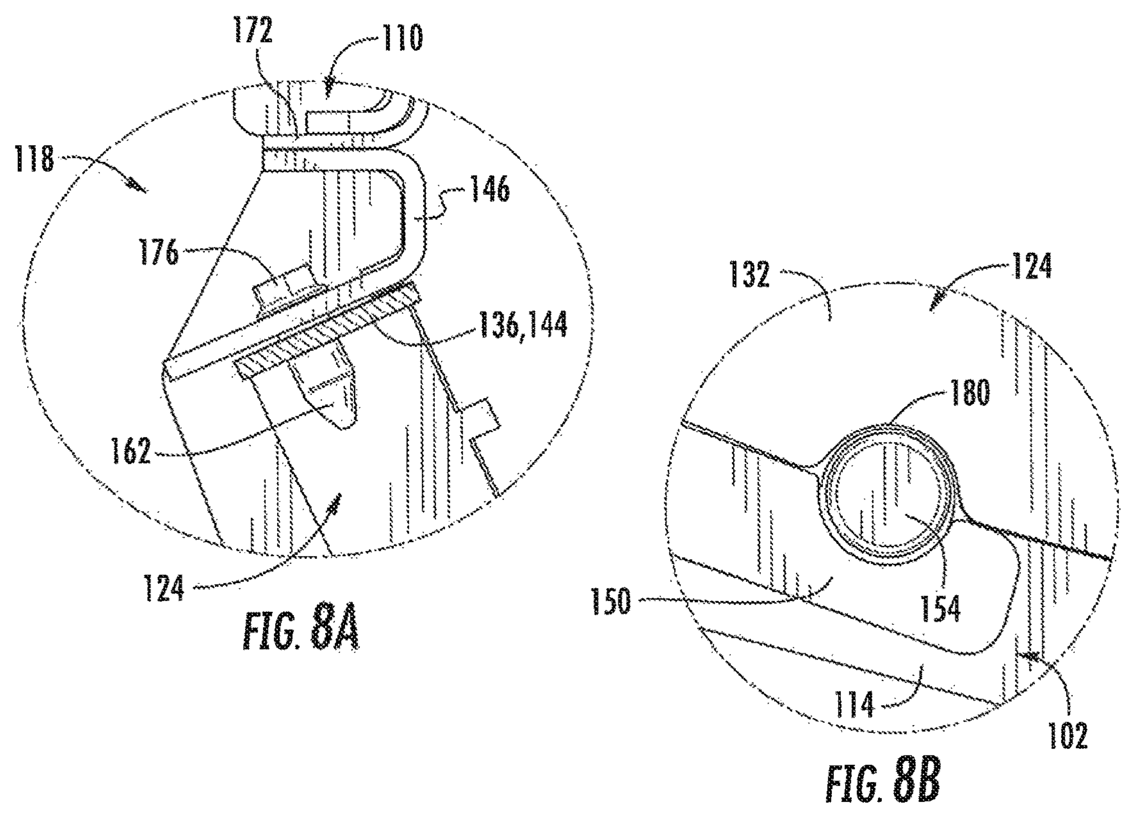
FIG. 8A
FIG. 8B 132
180
124
154
132
180
114
132
102

SYSTEM AND METHOD FOR INSTALLING SEPARATOR GRATES WITHIN AN AGRICULTURAL COMBINE

FIELD OF THE INVENTION

The present subject matter relates generally to agricultural combines and, more particularly, to a system and method for installing separator grates from a single side of an agricultural combine.

BACKGROUND OF THE INVENTION

Many agricultural harvesters, such as combines, utilize a rotary threshing and/or separating system. The system typically includes at least one rotor drivingly rotated within a rotor housing including a perforated concave spaced radially outwardly thereof. The rotor typically includes a frusto-conical inlet end having a helical flight or flights therearound for conveying a flow of crop material through a circumferential space defined between the rotor and the housing. The main body of the rotor often includes an array or layout of threshing elements (e.g., rasp bars) that protrude radially outwardly towards the housing for conveying a mat of the crop material along a helical path through the circumferential space. The threshing elements typically cooperate with the concave to separate larger components of the crop, namely crop residue commonly referred to as straw, which includes stalks, stems, cobs and the like, from the smaller grain and material other than grain (MOG).

The concave typically includes grates that may either be maintained in a fixed position or movable in a radial direction with respect to a rotor rotational axis to provide adjustable clearance with respect to the rotor. Generally, concave grates near the front of the threshing rotor are adjustable and referred to as "threshing concaves," while the concave grates in the rear section are fixed in position and referred to as "separator grates." To the rear of the separator grates is the rotor discharge section. Currently, the installation and removal of the separator grates of a combine's threshing system is difficult due to their weight, access to mounting hardware, and minimal operator access space between the separator grates and other components of the harvester.

Accordingly, an improved system and method for installing separator grates within an agricultural combine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for installing separator grates within an agricultural combine. The system may generally include a grate frame having first and second frame members extending circumferentially between a proximal end of the grate frame and a distal end of the grate frame. The system may also include a first separator grate section configured to be supported between the first and second frame members along a first circumferential frame section of the grate frame and a second separator grate section configured to be supported between the first and second frame members along a second circumferential frame section of the grate frame, in addition, the grate frame may include a first guide rail extending adjacent to the first frame member along at least a portion of the first circumferential frame section and a second guide rail extending adjacent to the second frame member along at least a portion of the first circumferential frame section. When the first separator grate section is being installed from a side of the grate flame located adjacent to the proximal end, at least a portion of the first separator grate section may be configured to ride along the first and second guide rails at a location between the first and second frame member as the first separator grate section is moved towards the distal end of the grate frame.

In another aspect, the present subject matter is directed to a method for installing separator grates relative to a grate frame positioned within an agricultural combine. The grate frame may include first and second frame members extending circumferentially between a proximal end of the grate frame and a distal end of the grate frame. The grate frame may also define a first circumferential frame section for supporting a first separator grate section and a second circumferential frame section for supporting a second separator grate section The method may include inserting the first separator grate section between the first and second frame members from a side of the grate frame located adjacent to the proximal end of the grate frame and positioning at least a portion of the first separator grate section on first and second guide rails extending along at least a portion of the first circumferential frame section of the grate frame, wherein the first guide rail extends adjacent to the first frame member and a second guide rail extends adjacent to the second frame member. In addition, the method may include moving the first separator grate section between the first and second frame members towards the distal end of the grate frame while the first separator grate section rides along the first and second guide rails and coupling a mounting end of the first separator grate section to the distal end of the grate frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which;

FIG. 8 illustrates a similar cross-sectional view to that shown in FIG. 5, particularly illustrating the first grate section fully installed relative to the grate frame;

FIG. 8A illustrates a close-up view of a portion of the grate frame and the first grate section shown in FIG. 8;

FIG. 8B illustrates a close-up view of another portion of the grate frame and the first grate section shown in FIG. 8;

DETAILED DESCRIPTION OF THE INVENTION

Figure 1:
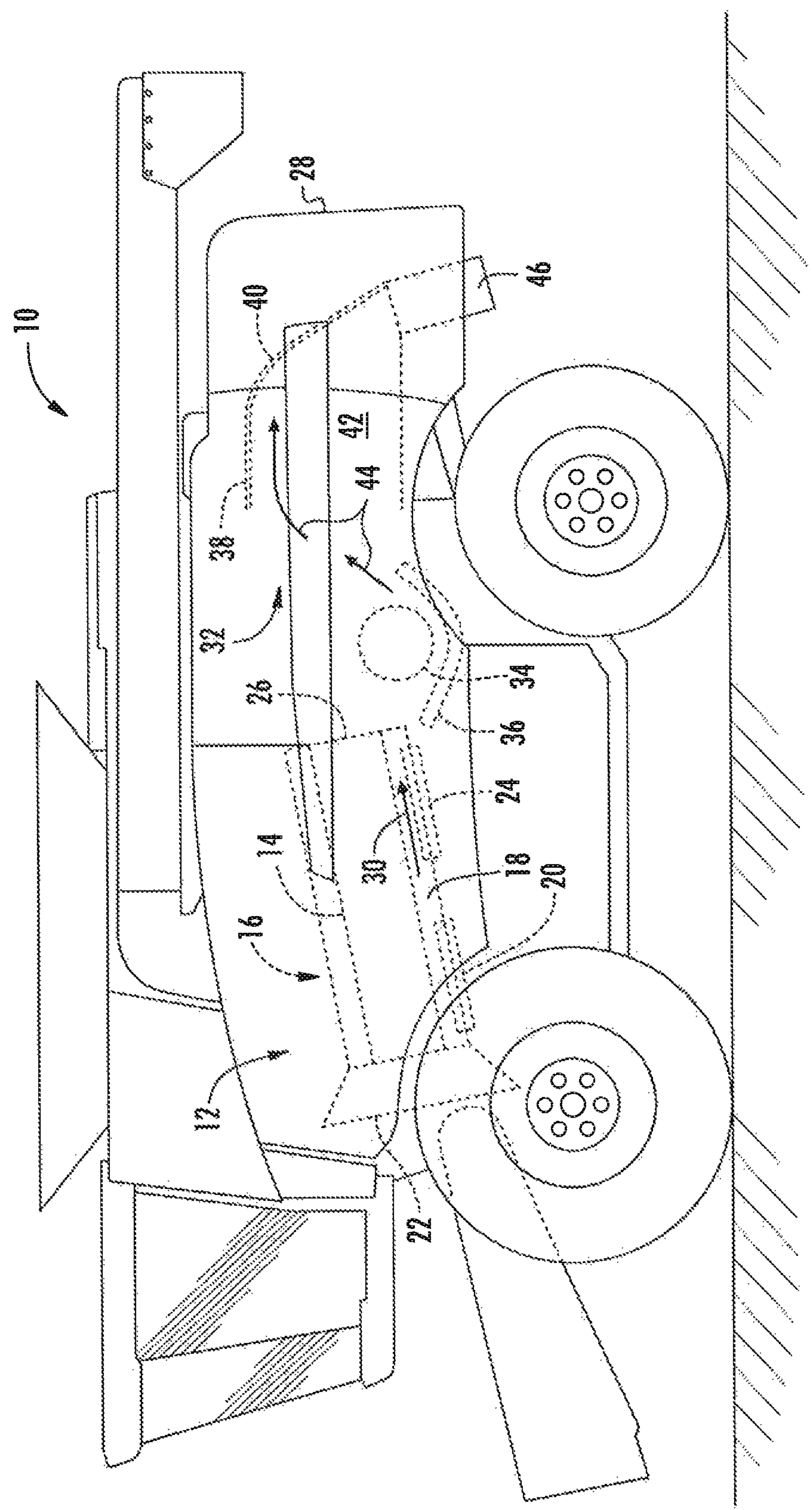
FIG. 1 illustrates a side view of one embodiment of an agricultural combine in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for installing separator grates within a cylindrical rotor cage of a threshing system of an agricultural combine. Specifically, the system may allow for separator grates to be quickly and easily installed within a rotor cage from a single side of the combine. In several embodiments, the system may include a separator grate frame configured to support a plurality of separator grate sections. As will be described below, the separator gate frame may include one or more guide rails and/or support members for supporting one or more of the grate sections as such section(s) is being installed relative to the frames. In addition, the grate frame and the grate sections may include alignment features to ensure that each grate section is properly aligned relative to the grate frame and/or relative to an adjacent grate section.

Referring now to the drawings, FIG. 1 illustrates a simplified, side view of one embodiment of an agricultural combine 10. In general, the combine 10 may be configured the same as or similar to any suitable agricultural combine known in the art. For instance, as shown in FIG. 1, the combine 10 may include an axially arranged threshing system 12. As is generally understood, the threshing system 12 may include a cylindrical rotor 14 rotatably supported within a cylindrical housing or cage 16 for conveying a flow of crop material in a helical flow path along a circumferential space 18 defined between the rotor 14 and the cage 16. The cage 16 may generally include one or more circumferentially extending threshing concaves 20 positioned at or adjacent to its upstream end 22 and one or more circumferentially extending separator grates 24 positioned at or adjacent to its downstream end 26. As the crop material is moved through the space 18 towards a rear end 28 of the combine 10 (indicated by arrow 30), the crop (e.g., grain, legumes, and/or the like) may be separated from the residue (e.g., husks, pods and/or the like) and subsequently removed from the threshing system 12. The crop residue may continue along the helical path and may be subsequently discharged through a discharge opening (not shown) defined at the downstream end 26 of the threshing system 12.

In addition, the combine 10 may include a crop residue distribution system 32 for expelling the crop residue from the combine 10. As shown, the distribution system 32 may include a chopper assembly 34 rotatably supported above a concave pan 36. As is generally understood, the chopper assembly 34 may be configured to be rotated to convey the flow of crop residue exiting the threshing system 12 towards the rear end 28 of the combine 10. In several embodiments, the crop residue may be conveyed or propelled along a series of internal shields or panels, such as a guide panel 38 (e.g., a strawhood) and a windrow door assembly 40, towards the rear end 28 of the combine 10. For instance, as shown in FIG. 1, the concave pan 36 may be angled in a manner such that the crop residue may be propelled rearwardly and upwardly from the chopper assembly 34 into a distribution chamber 42, wherein the residue is directed along the guide panel 38 towards the windrow door assembly 40 (indicated by arrow 44). Depending on whether the windrow door assembly 40 is in a closed or opened position, the crop residue may be directed through the distribution chamber 42 and into a crop residue chopper and/or spreader 46 for swath spreading (e.g., when the door is closed) or through a rear opening of the combine 10 for windowing (e.g., when the door is opened).

It should be appreciated that the configuration of the agricultural combine 10 described above and shown in FIG. 1 is provided only to place the present subject matter in an exemplary field of use. Thus, it should be apparent that the present subject matter may be readily adaptable to any manner of combine configuration.

Figure 2:
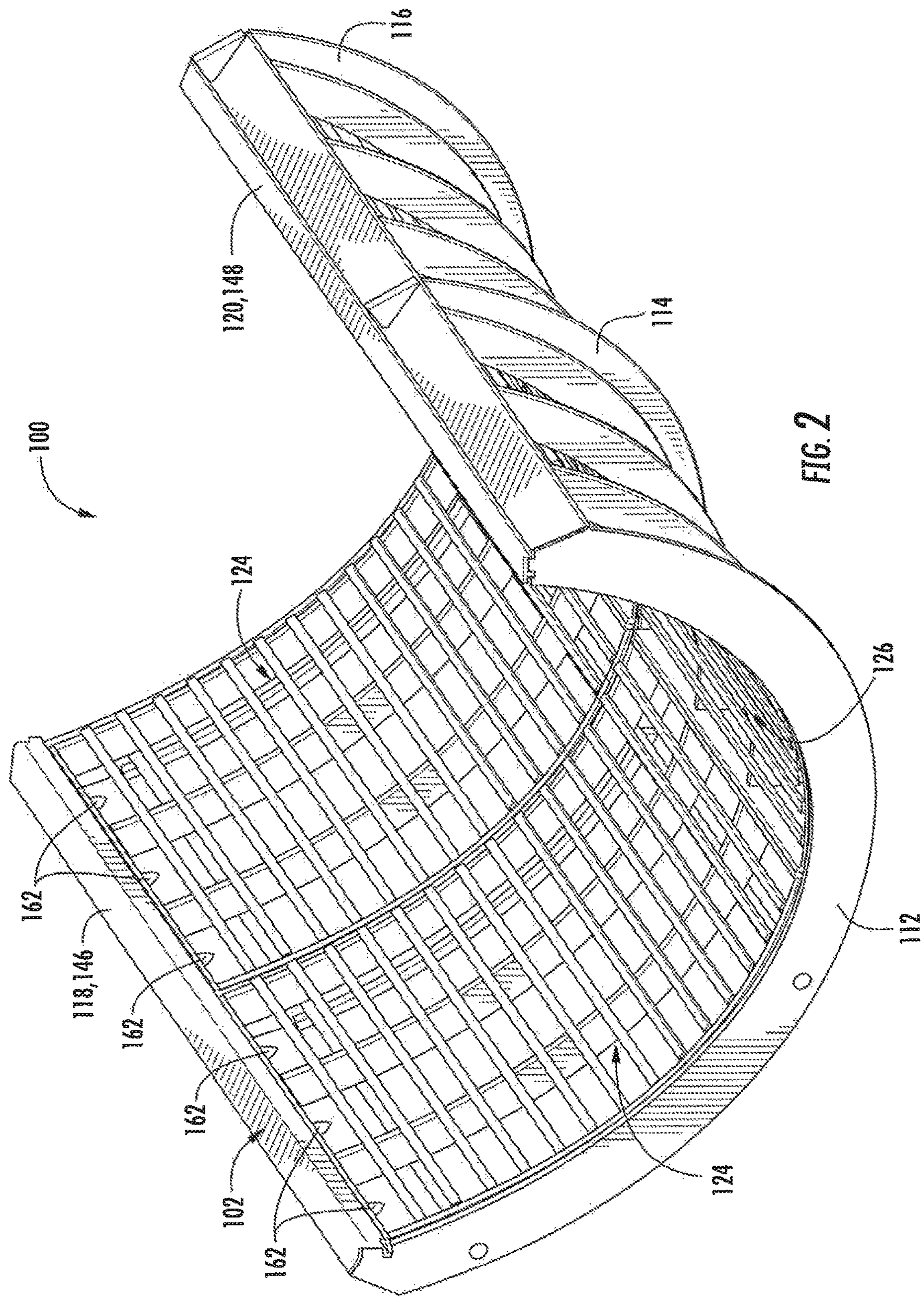
FIG. 2 illustrates a perspective view of one embodiment of a system for installing separator grates within an agricultural combine in accordance with aspects of the present subject matter, particularly illustrating the various system components assembled together.
Figure 3:
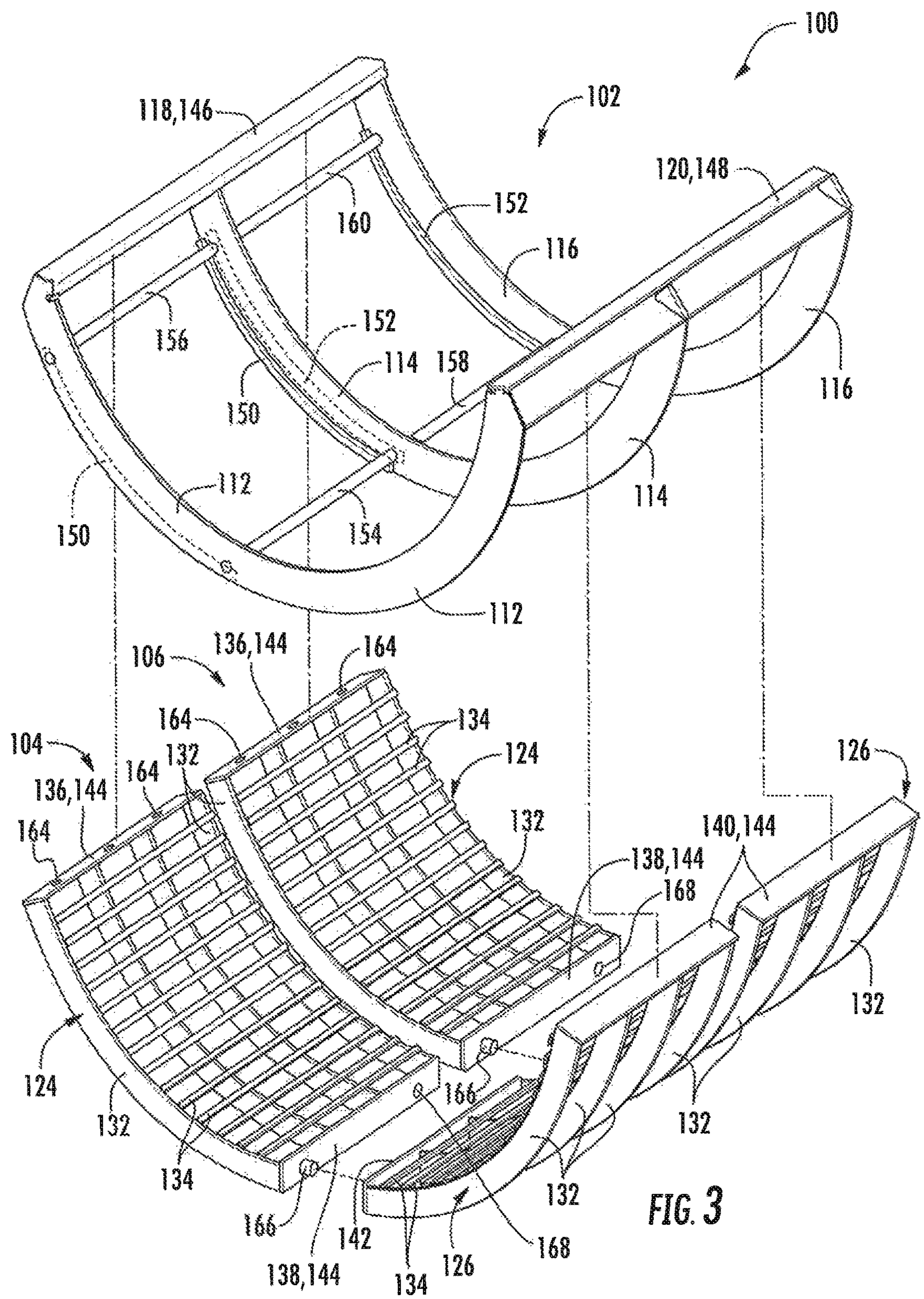
FIG. 3 illustrates another perspective view of the system shown in FIG. 2, particularly illustrating the system components exploded away from one another.

Referring now to FIGS. 2 and 3, differing views of one embodiment of a system 100 for installing separator grates within an agricultural combine are illustrated in accordance with aspects of the present subject matter. Specifically, FIG. 2 illustrates an assembled, perspective view of various components of the system 100. Additionally, FIG. 3 illustrates an exploded, perspective view of the system components shown in FIG. 2.

As shown in the illustrated embodiment, the system 100 may generally include a separator grate frame 102 and a plurality of separator grate sections configured to be supported by the grate frame 102. For instance, the system may include first and second pairs 104, 106 of separator grate sections, with each pair 104, 106 including a first separator grate section 124 and a second separator grate section 126. In general, the grate frame 102 and the corresponding grate sections 124, 126 may be configured to form part of the cylindrical housing or rotor cage 108 (FIG. 4) of a threshing system for an agricultural combine (e.g., by forming part of the rotor cage 16 described above). For instance, as will be described below, opposed ends of the grate frame 102 may be configured to be coupled to an upper cage portion 110 (FIG. 4) of the corresponding rotor cage 108 such that the grate frame 102 and the upper cage portion 110 fully encircle or encompass the associated rotor of the threshing system.

In several embodiments, the grate frame 102 may include a plurality of frame members 112, 114, 116 extending circumferentially between a first circumferential end 118 of the frame 102 and a second circumferential end 120 of the frame 102. For example, as particularly shown in FIG. 3, the frame 102 may include a first frame member 112, a second frame member 114, and a third frame member 116, with the frame members 112, 114, 116 configured to be spaced axially apart from one another to allow a corresponding pair 104, 106 of separator grate sections 124, 126 to be installed between each adjacent pair of frame members 112, 114, 116. For instance, the first pair 104 of separator grate sections 124, 126 may be installed between the first and second frame members 112, 114 so that the grate sections 124, 126 extend circumferentially between the frame members 112, 114 from a location adjacent to the first circumferential end 118 of the grate frame 102 to a location adjacent to the second circumferential end 120 of the grate frame 102. Similarly, the second pair 106 of separator grate sections 124, 126 may be installed between the second and third frame members 114, 116 so that the grate sections 124, 126 extend circumferentially between the frame members 114, 116 from a location adjacent to the first circumferential end 118 of the grate frame 102 to a location adjacent to the second circumferential end 120 of the grate frame 102. However, in other embodiments, the grate frame 102 may include any other suitable number of frame members so as to accommodate any number of corresponding pairs of grate sections. For instance, in one embodiment, the grate frame 102 may simply include two frame members configured to accommodate a single pair of grate sections.

It should be appreciated that, for purposes of description, the first circumferential end 118 of the grate frame 102 will also be referred to herein as the "distal end 118" of the frame 102 while the second circumferential end 120 of the grate frame 102 will also be referred to herein as the "proximal end 120" of the frame 102. The terms "distal" and "proximal" are used generally herein to denote the positioning of a given component(s) (or a portion of a given component(s)) relative to the access point at which an operator may be allowed to the access the grate frame 102 for installing the grate sections thereon. Thus, for example, the proximal end 120 of the grate frame 102 may generally refer to the circumferential end of the grate frame 102 that is closest to the access point for the operator while the distal end 118 may generally refer to the circumferential end of the grate frame 102 that is furthest away from the access point for the operator.

As indicated above, each pair 104, 106 of separator grate sections may include a first separator grate section 124 and a second separator grate section 126, with the grate sections 124, 126 being configured to be installed end-to-end between their respective frame members 112, 114 so that the grate sections 124, 126 extend circumferentially along substantially the entire circumferential span defined between the distal and proximal ends 118, 120 of the grate frame 102 (e.g., an approximately 180 degree span). For instance, each first grate section 124 may be configured to be supported along a first circumferential frame section 128 (FIG. 4) of the grate frame 102 (e.g., an approximately 90 degree span extending circumferentially from the distal end 118 of the frame 102 to the middle of the frame members 112, 114, 116) and each second grate section 126 may be configured to be supported along a second circumferential frame section 130 (FIG. 4) of the grate frame 102 (e.g., an approximately 90 degree span extending circumferentially from the proximal end 120 of the frame 102 to the middle of the frame members 112, 114, 116).

Additionally, in several embodiments, each grate section 124, 126 may include a plurality of base grate members 132 extending circumferentially between the opposed ends of the grate section 124, 126 and a plurality of transverse grate members 134 extending transverse to the base members 132. For instance, as shown in FIG. 3, the base grate members 132 of each first grate section 124 may extend circumferentially between a first mounting end 136 of the grate section 124 and a first interface end 138 of the grate section 124. Similarly, the base grate members 132 of each second grate section 126 may extend circumferentially between a second mounting end 140 of the grate section 126 and a second interface end 142 of the grate section 126. Moreover, as shown in FIG. 3, each grate section 124, 126 may also include a mounting plate or flange 114 positioned at each of its circumferential ends 136, 138, 140, 142.

Referring still to FIGS. 2 and 3, the grate frame 102 may also include one or more mounting flanges or plates 146, 148 disposed at its distal and proximal ends. For instance, as shown in FIG. 3, the grate frame 102 includes a first mounting plate 146 positioned at its distal end 118 and a second mounting plate 148 positioned at its proximal end 120. As will be described below, the first mounting plate 146 may be configured to be coupled to the mounting flange 144 positioned at the first mounting end 136 of each first grate section 124 when the first grate sections 124 are installed on the frame 102. Similarly, the second mounting plate 148 may be configured to be coupled to the mounting flange 144 positioned at the second mounting end 140 of each second grate section 126 when the second grate sections 126 are installed on the frame 102. In addition, the mounting plates 146, 148 may also be configured to be coupled to corresponding portions of the housing or cage 108 (FIG. 4) of the associated threshing system.

Moreover, in several embodiments, the grate frame may also include a pair of guide rails 150, 152 positioned between each adjacent pair of frame members 112, 114, 116. Specifically, as shown in FIG. 3, a first pair of guide rails 150 may be positioned between the first frame member 112 and the second frame member 114, with one of the rails 150 extending circumferentially directly adjacent to the side of the first frame member 112 that faces the second frame member 114 and the other rail 150 extending circumferentially directly adjacent to the side of the second frame member 114 that faces the first frame member 112. Similarly, a second pair of guide rails 152 may be positioned between the second frame member 114 and the third frame member 116, with one of the rails 152 extending circumferentially directly adjacent to the side of the second frame member 114 that faces the third frame member 116 and the other rail 152 extending circumferentially directly adjacent to the side of the third frame member 116 that faces the second frame member 114.

In several embodiments, the rails 150, 152 may generally be configured to extend circumferentially along all or a portion of the first circumferential frame section 128 of the grate frame 102 to serve as a support/guide means for the first grate sections 124 as such grate sections 124 are being installed relative to the grate frame 102. For example, when the first grate section 124 of the first pair 104 of grate sections 124, 126 is inserted between the first and second frame members 112, 114 from the side of the grate frame 102 adjacent to its proximal end 120, a portion of the grate section 124 at or adjacent to its first mounting end 136 may be positioned onto the first pair of guide rails 150 so that the rails 150 support a portion of the weight of the grate section 124. Thereafter, the portion of the grate section 124 contacting the guide rails 150 may ride along the rails 150 as the first mounting end 136 of the first grate section 124 is moved in the direction of the distal end 118 of the grate frame 102. Of course, the second pair of guide rails 152 may be utilized in a similar manner when installing the first grate section 124 of the second pair 106 of grate sections 124, 126 between the second and third frame members 114, 116.

Additionally, in several embodiments, the grate frame 102 may include one or more transverse support members 154, 156, 158, 160 coupled between each adjacent pair of frame members 112, 114, 116. For instance, as shown in FIG. 3, the grate frame 102 includes a pair of transverse support members (e.g., a first transverse support member 154 and a second transverse support member 156) extending directly between the first and second frame members 114, 116 and a pair of transverse support members (e.g., a third transverse support member 158 and a fourth transverse support member 160) extending directly between the second and third frame members 114, 116. In one embodiment, each transverse support members 154, 156, 158, 160 may be configured to extend between its corresponding frame members 112, 114, 116 at a location at or adjacent to one of the ends of each pair of guide rails 150, 152. For instance, as shown in the illustrated embodiment, the first transverse support member 154 extends between the first and second frame members 112, 114 at a location adjacent to the proximal ends of the first pair of guide rails 150 and the second transverse support member 156 extends between the first and second frame members 112, 114 at a location adjacent to the distal ends of the first pair of guide rails 150.

It should be appreciated that the various transverse support members 154, 156, 158, 160 may be configured to serve as structural cross-wise supports for the frame members 112, 114, 116, thereby providing the grate frame 102 with increased structural integrity. Additionally, as will be described below, all or a portion of the transverse support members 154, 156, 158, 160 may be configured to serve as support means for the first grate sections 124 and/or a retention means for retaining the first grate sections 124 relative to the grate frame 102.

Moreover, as will be described in greater detail below, the grate frame 102 and/or the grate sections 124, 126 may include one or more alignment features for aligning the grate sections 124, 126 relative to the grate frame 102. For instance, in one embodiment, the grate frame 102 may include one or more alignment pins 162 (FIG. 2) extending from its first mounting plate 146 configured to be received within one or more corresponding alignment openings 164 (FIG. 3) defined in the mounting flange 144 disposed at the first mounting end 136 of each first grate section 124. Additionally, in one embodiment, the grate sections 124, 126 may include engagement features at their interface ends 138, 142 to ensure that each second grate section 126 is properly positioned relative to its corresponding first grate section 124 when the grate sections 124, 126 are installed on the frame 102 and/or to ensure that the grate sections 124, 126 are properly engaged and/or interlocked with each other. For instance, in one embodiment, each grate section 124, 126 may include one or more engagement pins 166 extending outwardly from its interface end 138, 142 that is configured to be received within a corresponding engagement opening 168 defined in the interface end 138, 142 of the adjacent grate section 124, 126.

Figure 4:
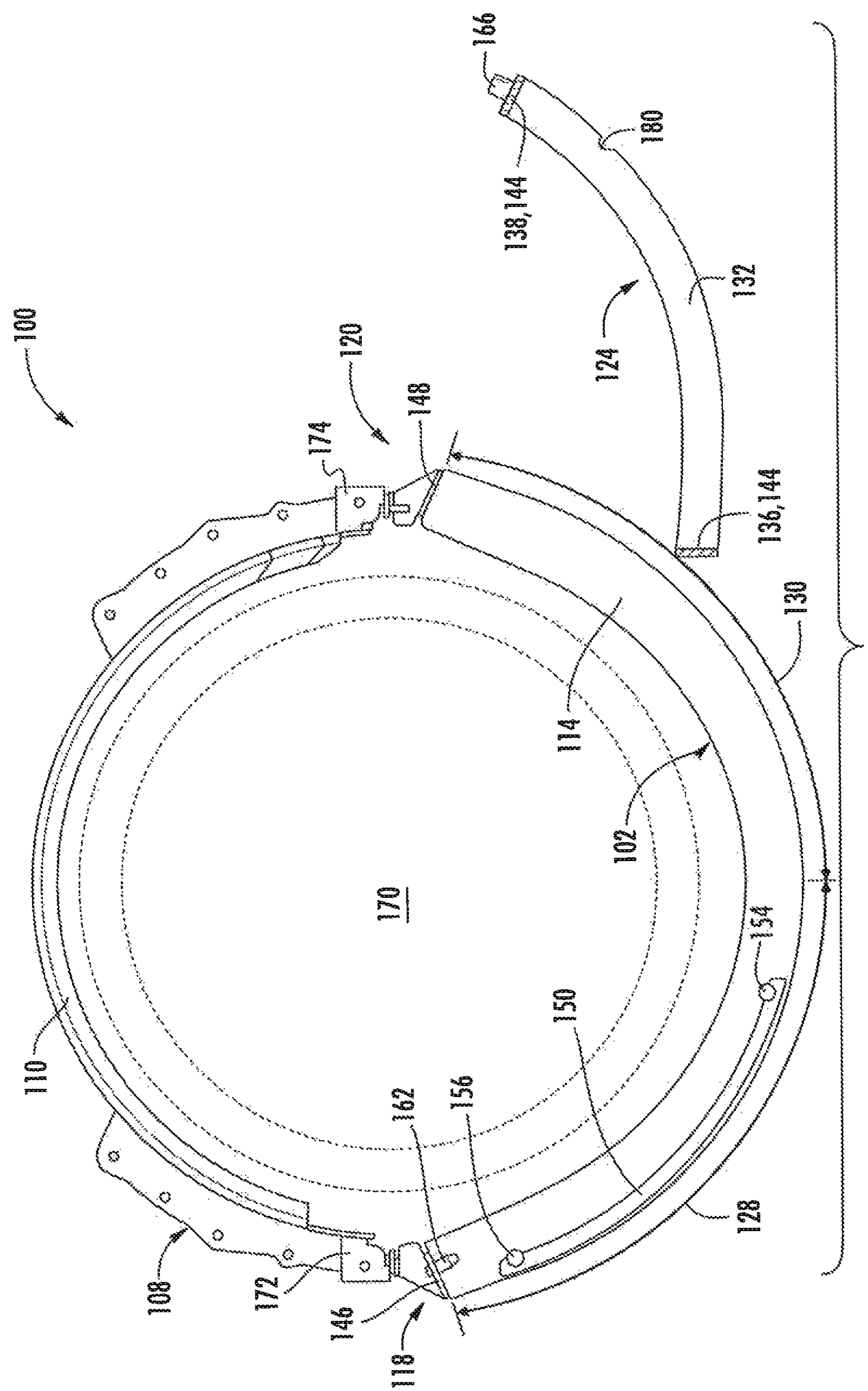
FIG. 4 illustrates a cross-sectional view of a grate frame of the disclosed system coupled to an upper cage portion of a cylindrical housing or cage surrounding a rotor of a threshing system in accordance with aspects of the present subject matter, particularly illustrating a first grate section of the system being inserted between first and second frame members of the grate frame along the side of the grate frame located adjacent to its proximal end.
Figure 5:
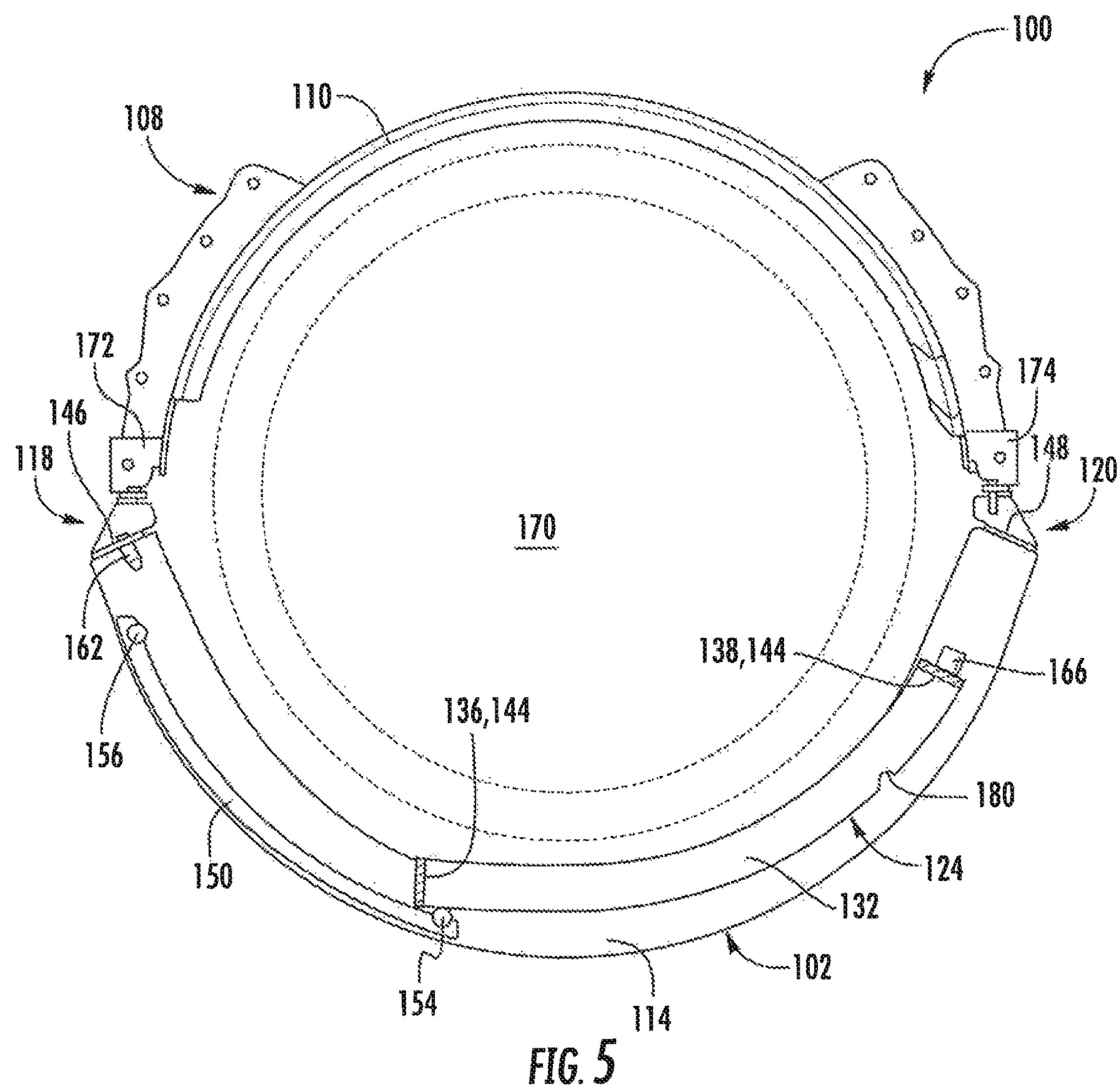
FIG. 5 illustrates a similar cross-sectional view to that shown in FIG. 4, particularly illustrating a portion of the first grate section being supported on guide rails of the grate frame.
Figure 6:
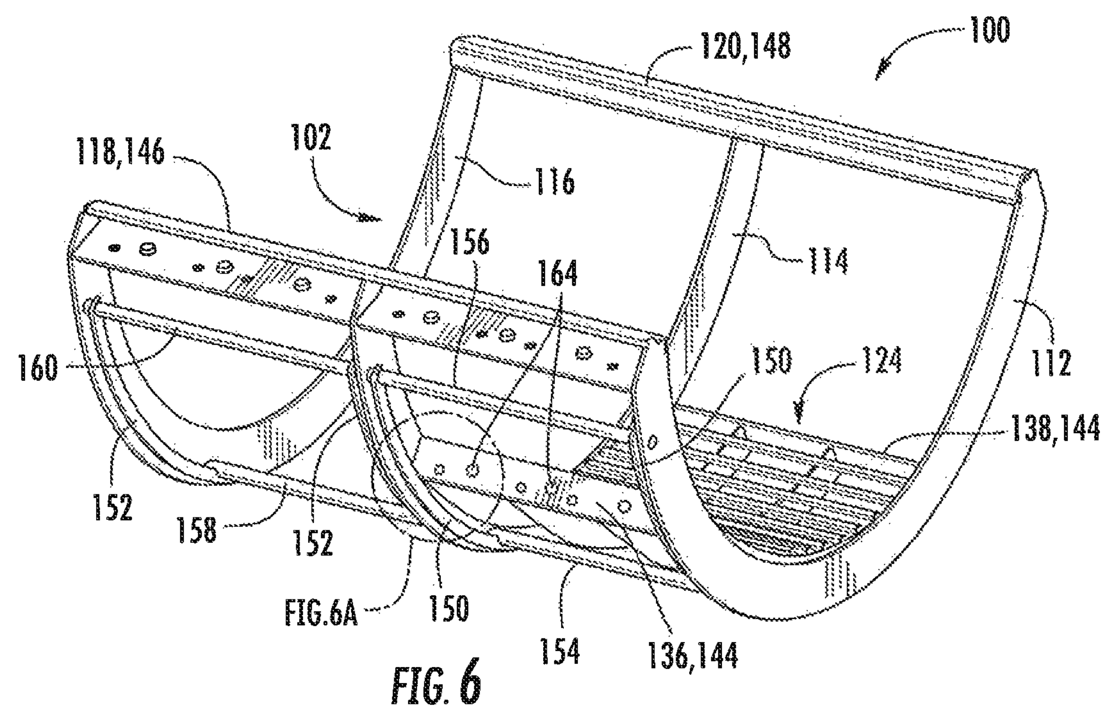
FIG. 6 illustrates a perspective view of the first grate section shown in FIG. 5 supported on the guide rails of the grate frame.
Figure 6A:
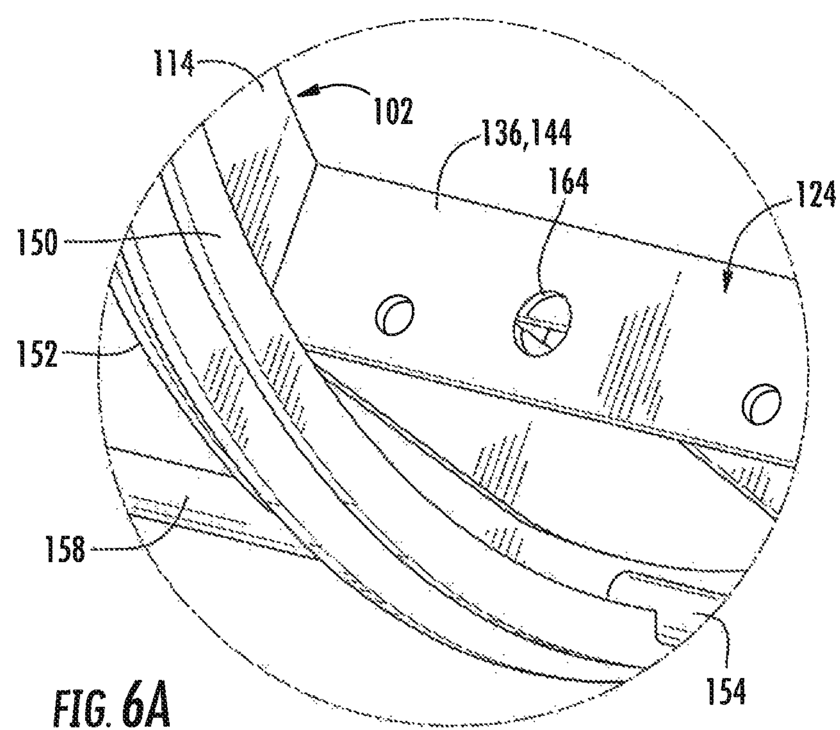
FIG. 6A illustrates a close-up, perspective view of a portion of the grate frame and first grate section shown in FIG. 6.
Figure 7:
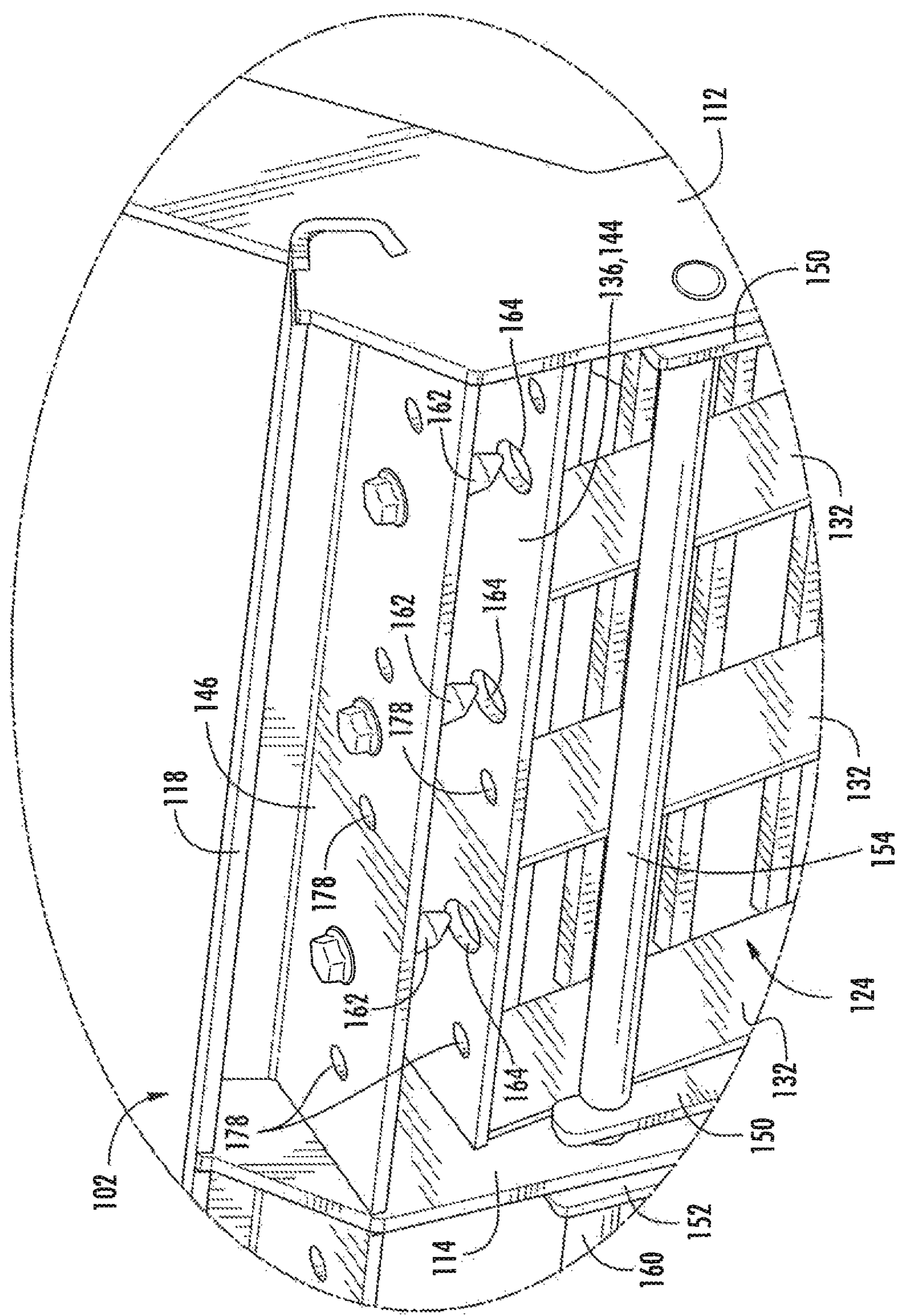
FIG. 7 illustrates a partial perspective view of the grate frame shown in FIG. 6 after the first grate section has been moved to a location adjacent to a distal end of the grate frame.
Figure 9:
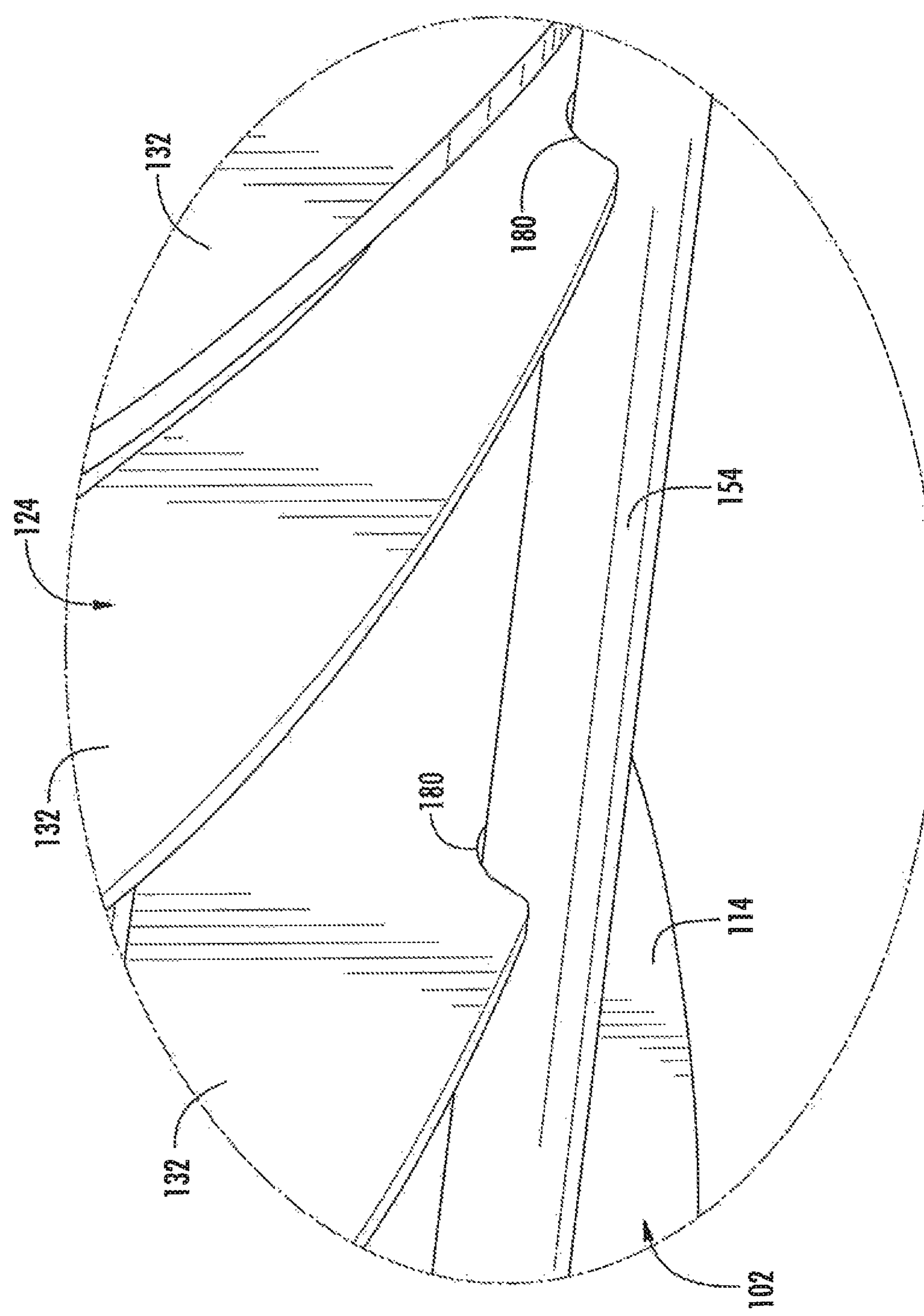
FIG. 9 illustrates a perspective view of the portion of the grate frame and first grate section shown in FIG. 81B.
Figure 10:
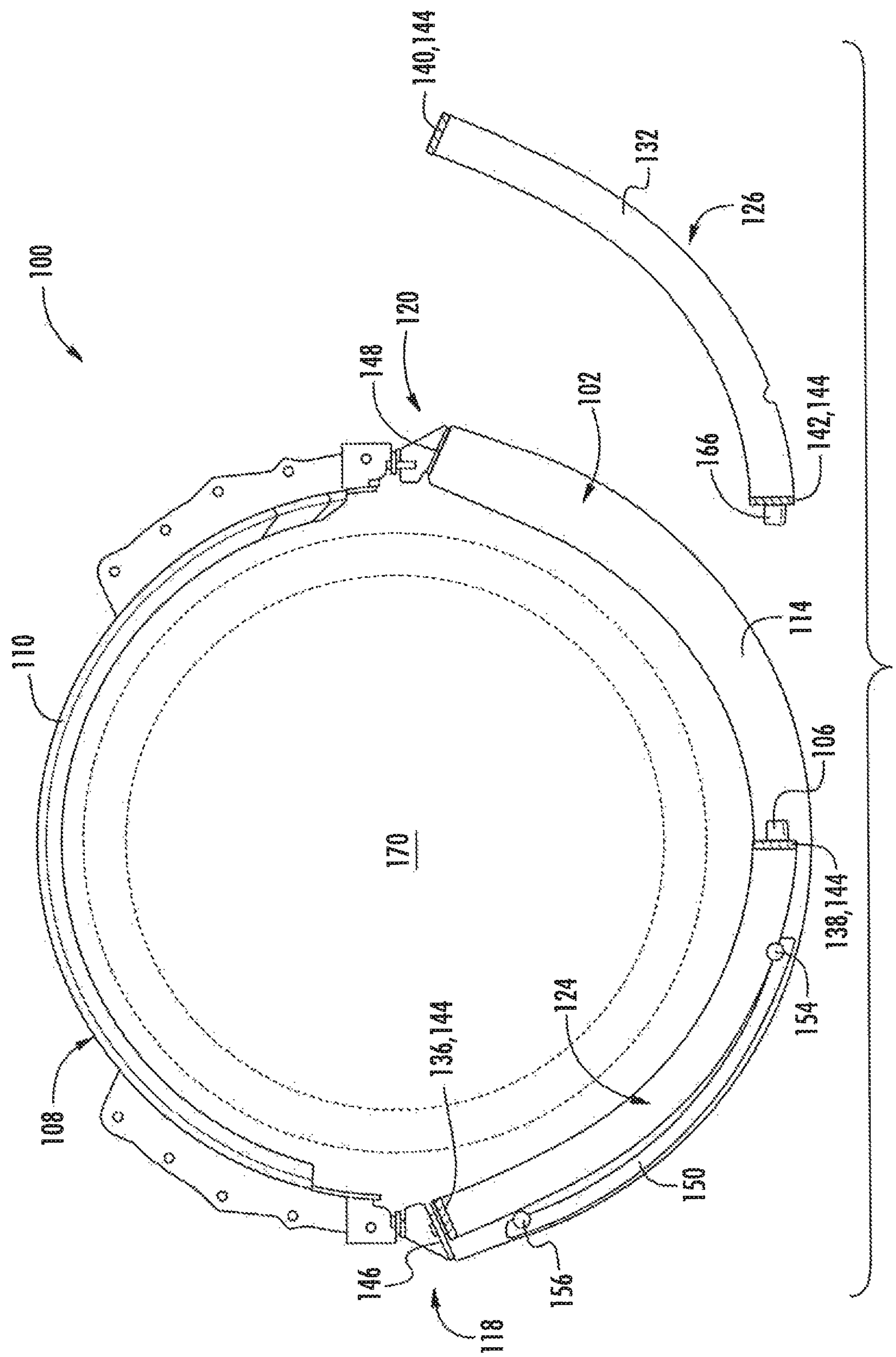
FIG. 10 illustrates a similar cross-sectional view to that shown in FIG. 8, particularly illustrating a second grate section of the system being inserted between the first and second frame members along the side of the grate frame located adjacent to its proximal end.
Figure 11:
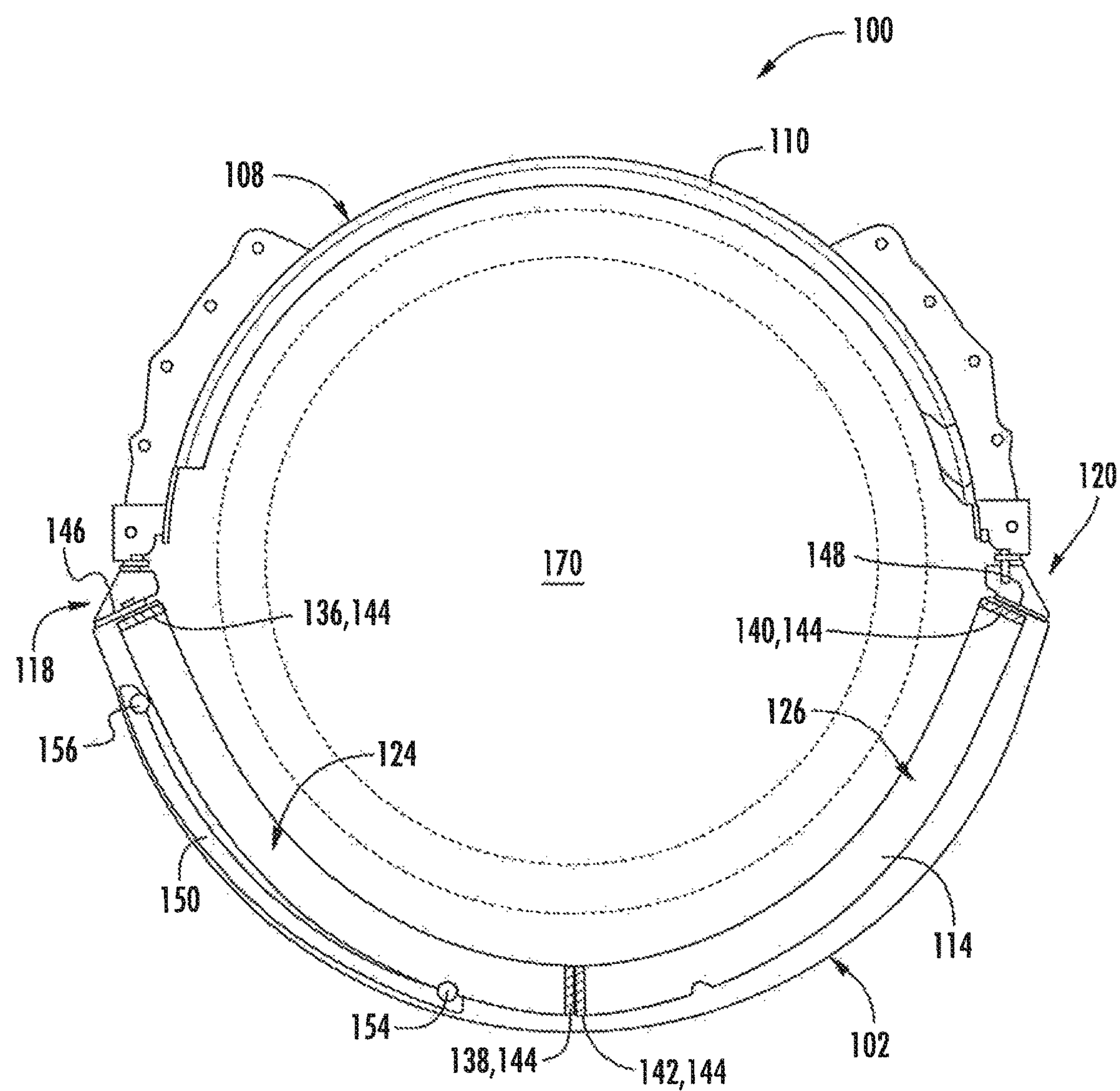
FIG. 11 illustrates a similar cross-sectional view to that shown in FIG. 10, particularly illustrating the second grate section fully installed relative to the grate frame.

The various steps for installing the grate sections 124, 126 onto the grate frame 102 will now be described with reference to FIGS. 4-11. Specifically, FIG. 4 illustrates a cross-sectional view of the grate frame 102 coupled to an upper cage portion 110 of a cylindrical housing or rotor cage 110 surrounding a rotor 170 of a threshing system, particularly illustrating the first grate section 124 of the first pair 104 of grate sections 124, 126 being inserted between the first and second frame members 112, 114 along the side of the grate frame 102 located adjacent to the proximal end 120 of the frame 102. FIG. 5 illustrates a similar cross-sectional view to that shown in FIG. 4, particularly illustrating a portion of the first grate section 124 being supported on the guide rails 150 positioned between the first and second frame members 114, 116. FIGS. 6 and 6A illustrate perspective and zoomed-in perspective views, respectively, of the first grate section 124 being supported by the guide rails 150. FIG. 7 illustrates a partial perspective view of the grate frame 102 after the first grate section 124 has been moved to a location adjacent to the distal end 118 of the frame 102. FIG. 8 illustrates a similar cross-sectional view to that shown in FIG. 5, particularly illustrating the first grate section 124 fully installed relative to the grate frame 102. Additionally, FIGS. 8A and 8B illustrate close-up views showing respective portions of the grate frame 102 and grate section 124 shown in FIG. 8. FIG. 9 illustrates a perspective view of the portion of the gate frame 124 shown in FIG. 8B. Moreover, FIG. 10 illustrates a similar cross-sectional view to that shown in FIG. 8, particularly illustrating the second grate section 126 of the first pair 104 of grate sections 124, 126 being inserted between the first and second frame members 112, 114 along the side of the grate frame 102 located adjacent to the proximal end 120 of the frame 102. Further, FIG. 11 illustrates a similar cross-sectional view to that shown in FIG. 10, particularly illustrating the second grate section 126 fully installed relative to the grate frame 102. It should be appreciated that, although the installation process will generally be described herein with reference to installing the first pair 104 of grate sections 124, 126 between the first and second frame members 124, 126, the same process may also be utilized to install the second pair 106 of grate sections 124, 126 between the second and third frame members 114, 116.

As indicated above, the disclosed grate frame 102 may be configured to form part of the cylindrical rotor cage 108 of a threshing system of an agricultural combine. Thus, as shown in FIG. 4, in several embodiments, the grate frame 102 may be configured to be coupled to an upper cage portion 110 of the cage 108 such that the grate frame 102 and the upper cage portion 110 fully encircle the rotor 170 (indicated by the dashed circle) of the threshing system. For instance, the mounting plate 146 positioned at the distal end 118 of the grate frame 102 may be configured to be coupled to a corresponding mounting flange 170 positioned at one circumferential end of the upper cage portion 110 while the mounting plate 148 positioned at the proximal end 120 of the grate frame 102 may be configured to be coupled to a corresponding mounting flange 174 positioned at the opposed circumferential end of the upper cage portion 110. In such an embodiment, the mounting plates 146, 148 of the grate frame 102 may be configured to be coupled to the mounting flanges 172, 174 of the upper cage portion 110 using any suitable means, such as by coupling the components together via mechanical fasteners.

As shown in FIG. 4, to install the first grate section 124 onto the grate frame 102, the first grate section 124 may be initially inserted between the first and second frame members 112, 114 from the side of the grate frame 102 positioned adjacent to the proximal end 120 of the frame 102. Thereafter, the first grate section 124 may be moved relative to grate frame 102 in the direction of its distal end 118 until the first mounting end 136 of the first grate section 124 is located within the radial space defined between the rotor 170 and the first pair of guide rails 150. As shown in FIG. 5, at such point, the portion of the first grate section 124 located at or adjacent to its first mounting end 136 may be lowered down onto the guide rails 150 and/or the adjacent transverse support member (e.g., the first transverse support member 154) so that such portion of the grate section 124 is supported by the guide rails 150 and/or the transverse support member 154.

Once supported by the guide rails 150 and/or the adjacent support member 154, the first grate section 124 may be moved or pushed in the direction of the distal end 118 of the grate frame 102 such that the first mounting end 136 of the grate section 124 rides along the circumferential path defined by the top sides of the guide rails 150. For instance, as shown in FIGS. 6 and 6A, opposed sides of the mounting flange 144 disposed at the first mounting end 136 of the first grate section 124 may be supported along the top sides of the guide rails 150 as the first grate section 124 is moved along the first circumferential frame section 128 of the grate frame 102. As such, the first grate section 124 may be guided upwardly along the guide rails 150 towards the distal end 118 of the grate frame 102 as it is pushed further relative to the frame 102.

As indicated above, the grate frame 102 and the first grate section 124 may, in several embodiments, include corresponding alignment features that provide a means for properly aligning the first mounting end 136 of the grate section 124 relative to the distal end 118 of the grate frame 102 as the first grate section 124 is moved upwardly along the guide rails 150 towards the distal end 118. For instance, as shown in FIG. 7, the grate frame 102 may include a plurality of alignments pins 162 extending outwardly from the first mounting plate 146 that are configured to be received within corresponding alignment openings 164 defined through the mounting flange 144 positioned at the first mounting end 136 of the first grate section 124. As such, as the first mounting end 136 of the first grate section 124 is moved towards the distal end 118 of the grate frame 102, the alignment pins 162 may be received within the alignment openings 164, thereby ensuring that the first grate section 124 is properly aligned with the distal end 118 of the frame 102. Suitable fasteners 176 (FIG. 8A) may then be inserted through aligned fastener openings 178 defined in the first mounting plate 146 and the adjacent mounting flange 144 to couple the first mounting end 136 of the first grate section 124 to the distal end 118 of the grate frame 102.

It should be appreciated that, in one embodiment, the alignment pins 162 may be tapered along their length so that the diameter of each pin 164 decreases as the pin 164 extends away from the first mounting plate 146. In such an embodiment, the alignment pins 163 may provide some tolerance for aligning the grate section 124 with the grate frame 102. It should also be appreciated that, in other embodiments, the alignment features may be reversed so that the alignment pins are configured to extend outwardly from the mounting flange 144 of the first grate section 124. In such embodiments, suitable alignment openings may be defined through the first mounting plate 146 of the grate frame 102 so that the alignments pins may be received within the corresponding openings for aligning the first mounting end 136 of the grate section 124 with the distal end 118 of the grate frame 102.

It should also be appreciated that, in several embodiments, the second transverse support member 156 may be configured to serve as an additional support means and/or alignment means for the first grate section 124. Specifically, in one embodiment, the second transverse support member 156 may be configured to project slightly outwardly relative to the top sides of the guide rails 150 such that, when the grate section 124 is pushed along the guide rails 150 and over the second transverse support member 156, the weight of the adjacent end 136 of the grate section 124 is transferred from the guide rails 150 to the support member 156. Moreover, the positioning of the support member 156 relative to the rails 150 may also serve to guide the first mounting end 136 of the first grate section 124 upwardly towards the alignment pins 166.

Referring now to FIGS. 8-9, when the first grate section 124 is positioned at its final installation location relative to the grate frame 102, the first grate section 124 may be coupled to the grate frame 102 to secure the grate section 124 at its final installation location. For instance, as particularly shown in FIGS. 8 and 8A, when the alignment pins 162 are received within the corresponding alignment openings 164 and the first mounting end 118 of the first grate section 124 is positioned adjacent to the distal end 118 of the grate frame 102, suitable fasteners 176 may be inserted through the aligned openings 178 defined in the first mounting plate 146 of the grate frame 102 and the adjacent mounting flange 144 of the grate section 124 to couple the components to each other.

Additionally, as particularly shown in FIGS. 8B and 9, when the first grate section 124 is positioned at its final installation location relative to the grate frame 102, one or both of the transverse support members 154, 156 may be configured to be received within a corresponding recessed feature defined by the first grate section 124, thereby allowing the first grate section 124 to be retained in position relative to the frame 102. Specifically, as shown in the illustrated embodiment, the base grate members 132 of the first grate section 124 define a recessed channel(s) 180 within which the first support member 154 may be received when the first grate section 124 is properly positioned relative to the grate frame 102. Such engagement between the support member 154 and the base grate members 132 may serve to prevent the first grate section 124 from sliding downwardly along the guide rails 150 in the direction away from the distal end 118 of the grate frame 102. Thus, when installing the first grate section 124, the grate section 124 may be moved upward along the guide rails 150 towards the distal end 118 of the grate frame 102 until the first transverse support member 154 is received within the recessed channel (s) 180. The first grate section 124 may then be retained in such position via the engagement between the support member 154 and its base grate members 132 to allow the first mounting plate 146 of the grate frame 102 to be secured to the adjacent mounting flange 144 of the grate section 124 via the fasteners 176.

It should be appreciated that, in other embodiments, the base grate members 132 of the first grate section 124 may be configured to define an additional recessed channel(s) such that, when the first grate section 124 is positioned at its final installation location relative to the grate frame 102, the second transverse support member 156 is received within the additional recessed channel(s). Alternatively, the recessed channel(s) may only be configured to be aligned with the second transverse support member 156 when the first grate section 124 is positioned at its final installation location relative to the grate frame 102 (e.g., as opposed to the first transverse support member 154).

Referring now to FIGS. 10 and 11, once the first grate section 124 is secured in position relative to the grate frame 102, the second grate section 126 may then be inserted between the first and second frame members 112, 114 from the side of the grate frame 102 positioned adjacent to the proximal end 120 of the frame 102. In doing so, the interface end 142 of the second grate section 126 may be aligned with the interface end 138 of the first grate section 124 such that the engagement pin(s) 166 extending from each interface end 138, 142 is received within the corresponding engagement opening(s) 158 defined in the adjacent interface end 138, 142, thereby interlocking or engaging the two grate sections 124, 126. Thereafter, the second mounting end 140 of the second grate section 126 may be rotated upward towards the proximal end 120 of the grate frame 102 until the mounting flange 144 positioned at the second mounting end 140 of the second grate section 126 is aligned with the adjacent mounting plate 148 of the grate frame 102. Suitable fasteners (not shown) may then be used to couple the second grate section 126 to the grate flame 102 to complete the installation of the first and second grate sections 124, 126.

Figure 12:
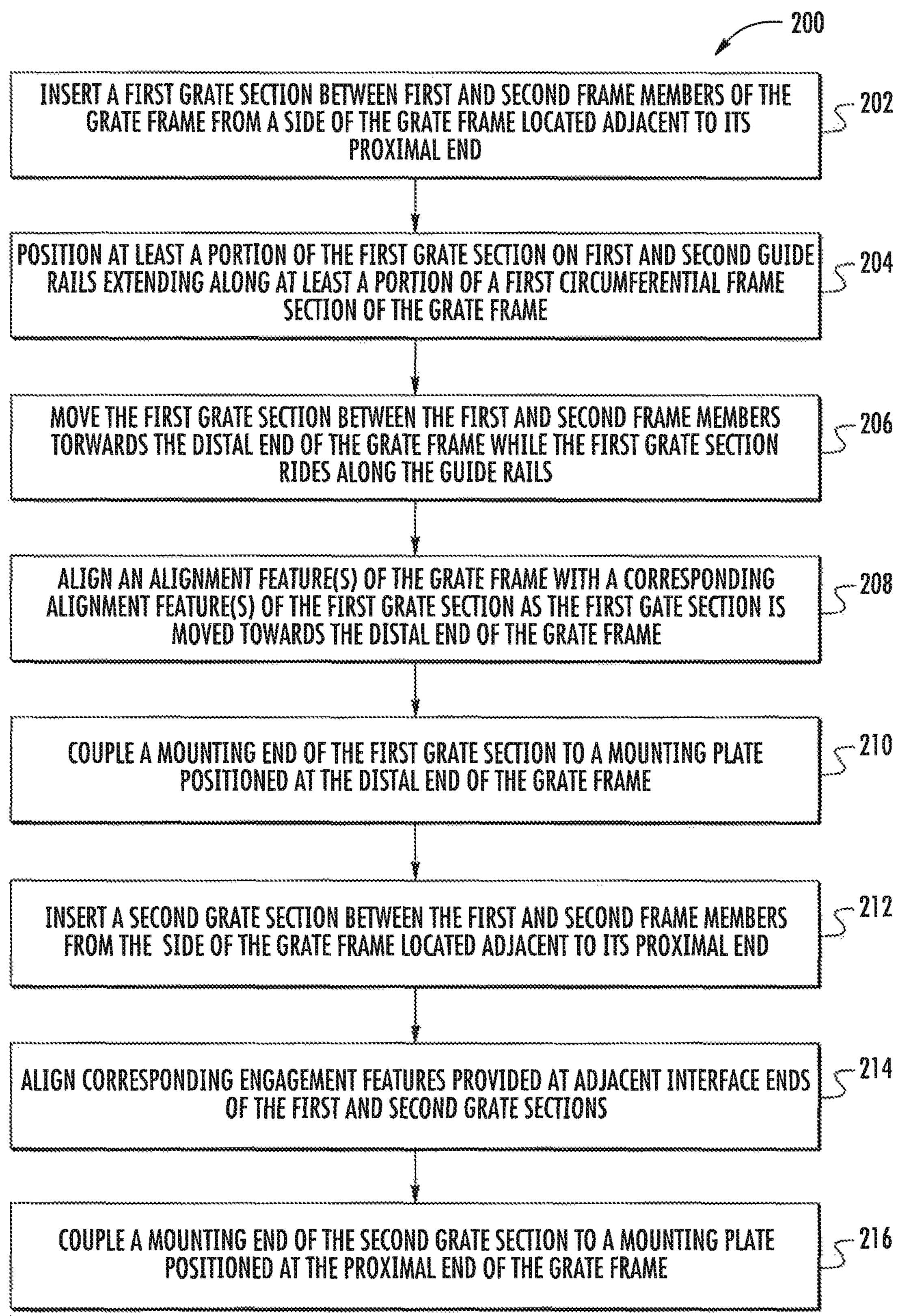
FIG. 12 illustrates a flow diagram of one embodiment of a method for installing separator grates within an agricultural combine in accordance with aspects of the present subject matter.

Referring now to FIG. 12, a flow diagram of one embodiment of a method 200 for installing separator grates within an agricultural combine is illustrated in accordance with aspects of the present subject matter. In general, the method 200 will be described herein with reference to the system 100 described above with reference to FIGS. 2-11. However, it should be appreciated by those of ordinary skill in the art that the disclosed method 200 may be implemented with any other system having any suitable system configuration consistent with the disclosure provided herein. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 12, at (202), the method 200 may include inserting a first grate section between first and second frame members of the grate frame from a side of the grate frame located adjacent to its proximal end. For instance, as indicated above, the first grate section 124 may be inserted between the first and second frame members 112, 114 at or adjacent to the proximal end 120 of the grate frame 102 and subsequently moved between the frame members 112, 114 towards the distal end 118 of the frame 102.

Additionally, at (204), the method 200 may include positioning at least a portion of the first grate section on first and second guide rails extending along at least a portion of a first circumferential frame section of the grate frame. For instance, as indicated above, the first grate section 124 may be moved between the frame members 112, 114 towards the distal end 118 of the frame 102 until a portion of the first grate section 124 is positioned over the guide rails 150, at which point such portion of the grate section 124 may be lowered down onto the guide rails 150. Thereafter, at (206), the method 200 may include moving the first grate section between the first and second frame members towards the distal end of the grate frame while the first grate section rides along the guide rails.

Moreover, at (208), the method 200 may include aligning an alignment feature(s) of the grate frame with a corresponding alignment feature(s) of the first grate section as the first gate section is moved towards the distal end of the grate frame. For instance, as indicated above, the grate frame 102 may include one or more alignment pins 162 extending outwardly from its first mounting plate 146 that are configured to be received within corresponding alignment openings 164 defined by a mounting flange 144 of the first grate section 124.

Referring still to FIG. 12, at (210), the method 200 may include coupling a mounting end of the first grate section to a mounting plate positioned at the distal end of the grate frame. For instance, as indicated above, suitable fasteners 176 may be coupled between the first mounting plate 146 of the grate frame 102 and the adjacent mounting flange 144 of the first grate section 124 to secure the first grate section 124 to the grate frame 102. In addition, as indicated above, the first grate section 124 may, in several embodiments, be configured to be retained relative to the grate frame prior to fastening the components together via the engagement provided by the transverse support member(s) 154 and the corresponding recessed channels 180.

Additionally, at (212), the method 200 may include inserting a second grate section between the first and second frame members from the side of the grate frame located adjacent to its proximal end. Moreover, at (214), the method 200 may include aligning corresponding engagement features provided at adjacent interface ends of the first and second grate sections. For instance, as indicated above, each grate section 124, 126 may include one or more engagement pins 166 extending outwardly from its interface end 138, 142 configured to be received within corresponding engagement openings 168 defined in the interface end 138, 142 of the adjacent grate section 124, 126.

Further, at (216), the method 200 may include coupling a mounting end of the second grate section to a mounting plate positioned at the proximal end of the grate frame. For instance, as indicated above, suitable fasteners may be coupled between the second mounting plate 148 of the grate frame 102 and the adjacent mounting flange 144 of the second grate section 126 to secure the second grate section 126 to the grate frame 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for installing separator grates within an agricultural combine, the system comprising:

a grate frame including first and second frame members extending circumferentially between a proximal end of the grate frame and a distal end of the grate frame;

a first separator grate section configured to be supported between the first and second frame members along a first circumferential frame section of the grate frame, the first separator grate section extending circumferentially between a mounting end and an opposed interface end of the first separator grate section, the first separator grate section defining a recess at a location closer to its interface end than its mounting end;

a second separator grate section configured to be supported between the first and second frame members along a second circumferential frame section of the grate frame, the second separator grate section extending circumferentially between a mounting end and an opposed interface end of the second separator grate section; and a transverse support member extending between the first and second frame members within the first circumferential frame section;

wherein the grate frame further includes a first guide rail extending adjacent to the first frame member along at least a portion of the first circumferential frame section and a second guide rail extending adjacent to the second frame member along at least a portion of the first circumferential frame section;

wherein, when the first separator grate section is being installed from a side of the grate frame located adjacent to the proximal end, at least a portion of the first separator grate section is configured to ride along the first and second guide rails at a location between the first and second frame member as the first separator grate section is moved towards the distal end of the grate frame;

wherein the transverse support member is configured to be received within the recess of the first separator grate section; and wherein the recess of the first separator grate section is spaced circumferentially from the interface end of the first separator grate section such that, when the transverse support member is received within the recess, the transverse support member supports the first separator grate section at a location spaced apart from an interface defined between the adjacent interface ends of the first and second separator grate sections when the first and second separator grate sections are installed onto the grate frame.

2. The system of claim 1, further comprising a first mounting plate positioned at the distal end of the grate frame, wherein the mounting end of the first separator grate section is configured to be coupled to the first mounting plate.

3. The system of claim 2, wherein the first mounting plate includes at least one alignment feature configured to be aligned with at least one corresponding alignment feature of the first separator grate section as the first separator gate section is moved towards the distal end of the grate frame.

4. The system of claim 3, wherein the at least one alignment feature corresponds to an alignment pin extending outwardly from the first mounting plate, the alignment pin configured to be received within a corresponding alignment opening defined through the mounting end of the first separator grate section.

5. The system of claim 1, wherein the transverse support member corresponds to a first transverse support member positioned at or adjacent to one circumferential end of the first and second guide rails, the system further comprising a second transverse support member positioned at or adjacent to an opposed circumferential end of the first and second guide rails.

6. The system of claim 1, wherein the first and second separator grate sections include corresponding engagement features, the corresponding engagement features being configured to engage each another at the interface defined between the adjacent interface ends of the first and second separator grate sections when the first and second separator grate sections are installed onto the grate frame.

7. The system of claim 6, wherein the corresponding engagement features comprise at least one engagement pin and at least one engagement opening configured to receive the at least one engagement pin when the first and second separator grate sections are installed onto the grate frame.

8. The system of claim 1, wherein the first circumferential frame section extends circumferentially from the distal end of the grate frame towards the proximal end of the grate frame and the second circumferential frame section extends circumferentially from the proximal end of the grate frame towards the distal end of the grate frame.

9. A method for installing separator grates relative to a grate frame positioned within an agricultural combine, the grate frame including first and second frame members extending circumferentially between a proximal end of the grate frame and a distal end of the grate frame, the grate frame defining a first circumferential frame section for supporting a first separator grate section and a second circumferential frame section for supporting a second separator grate section, the first separator grate section extending circumferentially between a mounting end and an opposed interface end of the first separator grate section, the second separator grate section extending circumferentially between a mounting end and an opposed interface end of the second separator grate section, the method comprising:

inserting the first separator grate section between the first and second frame members from a side of the grate frame located adjacent to the proximal end of the grate frame;

positioning at least a portion of the first separator grate section on first and second guide rails extending along at least a portion of the first circumferential frame section of the grate frame, the first guide rail extending adjacent to the first frame member and a second guide rail extending adjacent to the second frame member;

moving the first separator grate section between the first and second frame members towards the distal end of the grate frame while the at least a portion of the first separator grate section rides along the first and second guide rails until a transverse support member extending between the first and second frame members within the first circumferential frame is received within a recess defined by the first separator grate section at a location closer to its interface end than its mounting end;

coupling the mounting end of the first separator grate section to the distal end of the grate frame; and inserting the second separator grate section between the first and second frame members from the side of the grate frame located adjacent to the proximal end of the grate frame until the interface end of the second separator grate section is positioned adjacent to the interface end of the first separator grate section;

wherein the recess of the first separator grate section is spaced circumferentially from the interface end of the first separator grate section such that the transverse support member supports the first separator grate section at a location spaced apart from an interface defined between the adjacent interface ends of the first and second separator grate sections.

10. The method of claim 9, wherein a first mounting plate is positioned at the distal end of the grate frame, wherein coupling the mounting end of the first separator grate section to the distal end of the grate frame comprises coupling the mounting end of the first separator grate section to the first mounting plate.

11. The method of claim 10, further comprising aligning at least one alignment feature of the first mounting plate with at least one corresponding alignment feature of the first separator grate section as the first separator gate section is moved towards the distal end of the grate frame.

12. The method of claim 11, wherein the at least one alignment feature corresponds to an alignment pin extending outwardly from the first mounting plate, the alignment pin configured to be received within a corresponding alignment opening defined through the mounting end of the first separator grate section as the first separator gate section is moved towards the distal end of the grate frame.

13. The method of claim 9, further comprising aligning corresponding engagement features provided at the adjacent interface ends of the first and second separator grate sections.

14. The method of claim 13, wherein the corresponding engagement features comprise at least one engagement pin and at least one engagement opening configured to receive the at least one engagement pin when the second separator grate section is positioned adjacent to the first separator grate section between the first and second frame members.

15. The method of claim 9, further comprising coupling the mounting end of the second separator grate section to the proximal end of the grate frame.

16. The method of claim 9, wherein the first circumferential frame section extends circumferentially from the distal end of the grate frame towards the proximal end of the grate frame and the second circumferential frame section extends circumferentially from the proximal end of the grate frame towards the distal end of the grate frame.

* * * * *